(12) United States Patent  
Ishimura

(10) Patent No.: US 7,483,633 B2  
(45) Date of Patent: Jan. 27, 2009

(54) OPTICAL COMMUNICATION NETWORK

(75) Inventor: Katsuhiro Ishimura, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 489 days.

(21) Appl. No.: 11/289,603

(22) Filed: Nov. 30, 2005

(65) Prior Publication Data

US 2006/0120724 A1 Jun. 8, 2006

(30) Foreign Application Priority Data

Dec. 7, 2004 (JP) ............................. 2004-353770

(51) Int. Cl.
*H04J 14/00* (2006.01)
(52) U.S. Cl. ................ 398/75; 398/68; 398/70
(58) Field of Classification Search ............... 398/58, 398/66–68, 75–77, 70
See application file for complete search history.

(56) References Cited

U.S. PATENT DOCUMENTS

| | | | | |
|---|---|---|---|---|
| 6,411,410 | B1 * | 6/2002 | Wright et al. .................. | 398/79 |
| 2005/0129400 | A1 * | 6/2005 | Kim et al. ...................... | 398/67 |
| 2005/0158048 | A1 * | 7/2005 | Sung et al. ..................... | 398/66 |

OTHER PUBLICATIONS

"Current Status and Future Perspective of High-Speed Optical Access System", Hiromichi Shinohara, O Plus E, Japan, The Shin-Gizyutsu Communications Co., Inc., Jan. 2003, vol. 25, No. 1, pp. 49-55.

"Optical Fiber Telecommunications IV B Systems and Impairments", edited by Ivan Kaminov, Academic Press, USA, Mar. 2002, pp. 480-481.

"Success-DWA: A Highly Scalable and Cost Effective Optical Access Network", Yu-Li Hsueh, et al., IEEE Optical Communications, Aug. 2004, S24-S30.

"New Design for Optical Fiber Line Testing System Employing Two-Wavelength BiDirectional OTDR for PON", Yusuke Koshikiya et al., OECC/COIN, Jul. 2004, pp. 600-601.

* cited by examiner

*Primary Examiner*—Dzung D Tran
(74) *Attorney, Agent, or Firm*—Venable LLP; James R. Burdett

(57) ABSTRACT

An optical communication network using a communication system which is combined optical time-division multiplexing and optical wavelength-division multiplexing. The electric/optical converter converts an electric signal strings, which are input from the outside, into optical burst signals by selectively using a plurality of types of optical wavelengths. The network controller controls the optical wavelength selected by the electric/optical converter and the output timing of the optical burst signals for each one of the optical burst signals so that the optical burst signals received by the OLT are time-division multiplexed and wavelength-division multiplexed. By combining optical time-division multiplexing and optical wavelength-division multiplexing, an optical communication network of which the transmission band is wider than a TDMA system can be provided with a lower cost and lower facility scale than a WDM system.

4 Claims, 13 Drawing Sheets

FIG. 10
λu1 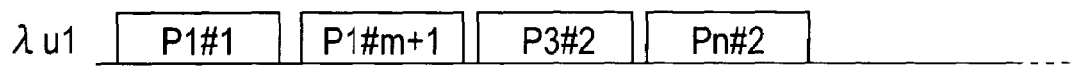
λu2 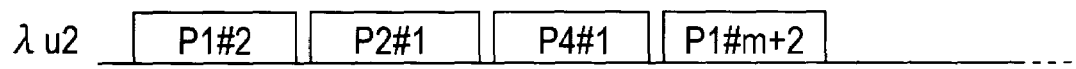
λu3 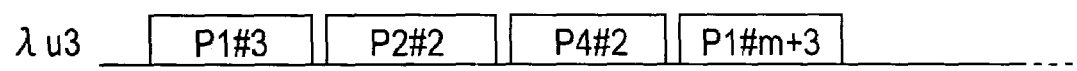
⋮
λum 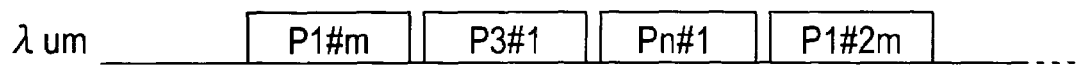

OPTICAL COMMUNICATION NETWORK

BACKGROUND OF THE INVENTION

1. Field of the Invention

The present invention relates to a PON (Passive Optical Network) type optical communication network, and more particularly to an optical communication network using a communication system combining optical time division multiplexing and optical wave division multiplexing systems.

2. Description of Related Art

As an optical communication network, PON, for example, is known. PON is a system for sharing one optical fiber by a plurality of subscribers (that is, homes which join the service) by branching an optical communication path by a coupler. PON is used by such a service as FTTH (Fiber To The Home). As an optical communication network based on PON, GE (Gigabit Either)-PON, A (Asynchronous transfer mode)-PON, B (Broadband)-PON, G (Gigabit)-PON, WDM (Wavelength Division Multiplexed)-PON and DWA (Dynamic Wavelength Allocation)-PON, for instance, are known. Here, GE-PON is standardized as IEEE 802.3ah, A-PON and B-PON are defined as ITU-T Recommendation G.983 series and G-PON is defined as ITU-T recommendation G.984 series.

GE-PON is a system for sharing a 1 gigabit/second transmission band (that is, communication speed) by 16 or more (e.g. 32) subscribers. As a document to disclosure GE-PON, the following Document 1, for example, is known.

Document 1: Hiromichi Shinohara: "Current status and future perspective of high-speed optical access system", O Plus E, Japan, The Shin-Gizyutsu Communications Co., Inc., January 2003, Vol. 25, No. 1, pp. 49-55

FIG. 13 is a conceptual diagram depicting a general configuration of GE-PON, and is substantially the same as FIG. 5 of Document 1. As FIG. 13 shows, the terminal device at the telephone station side, that is the OLT (Optical Line Terminal) 1301 is connected to 16 or more terminal devices at the subscriber side, that is, the ONUs (Optical Network Unit) 1304, via the optical fibers 1303 branched by the optical coupler 1302. The OLT 1301 is connected to a basic network 1305, such as a local IP (Internet Protocol) network or the Internet, and each ONU 1304 is connected to the communication terminal 1306, that is a personal computer.

As FIG. 13 shows, in the case of data transmission in the down direction, the Ethernet™ frames addressed to any ONU 1304 are time-division multiplexed and sent from the OLT 1301 to each ONU 1304. Each ONU 1304 extracts only the Ethernet™ frames addressed to itself from the receive data, and discards the other Ethernet™ frames. The optical wavelength in the down direction is 1480-1500 nm.

In the case of data transmission in the up direction, Ethernet™ frames are sent from each ONU 1304 to OLT 1301. At this time, each Ethernet™ frame can be time-division multiplexed using the optical coupler 1304 by appropriately adjusting the transmission timing of each ONU 1304. The optical wavelength in the up direction is 1260-1360 nm.

In GE-PON, DBA (Dynamic Bandwidth Assignment) is performed to improve data transmission efficiency in the up direction. DBA is a technology to change the transmission band (that is, communication speed) to be assigned to ONUs 1304 according to the number of ONUs 1304 in the transmission operation. A wider band is assigned to an ONU 1304 during transmission as the number of ONUs 1304, which perform the transmission operation simultaneously, is less. DBAs are employed by above A-PON, B-PON and G-PON.

The WDM-PON is a system of sharing an optical fiber by assigning a different optical length to each ONU. As a document to disclose WDM-PON, the following Document 2, for example, is known.

Document 2: Ivan Kaminov: "Optical Fiber Telecommunications IV B Systems and Impairments", Academic Press, USA, March 2002, pp. 480-481

FIG. 14 is a conceptual drawing depicting an example of a general configuration of WDM-PON, and is a drawing substantially the same as FIG. 10.8a in Document 2.

As FIG. 14 shows, the OLT 1411 and the wavelength router 1412 are connected by one optical fiber 1413, and the wavelength router 1412 is connected to a plurality of ONUs 1414 respectively. Each ONU 1414 uses a different optical wavelength from one another, and the optical wavelengths used in the down direction and in the up direction are also different. Therefore if the number of ONUs 1414 is "n", then the number of the types of optical wavelengths used for data transmission is "2n".

In the WDM-PON in FIG. 14, a two-core optical fiber may be used instead of a one-core optical fiber 1413 (see FIG. 10.8b-e in Document 2). If a two-core optical fiber is used, an optical multiplexer is used for the up direction, and an optical demultiplexer is used for the down direction instead of the wavelength router 1412 (see FIG. 10.8b in Document 2). By using a two-core optical fiber, each ONU 1414 can use a same wavelength for the up direction and down direction (see FIG. 10.8c in Document 2). Also in the case of WDM-PON in FIG. 14, a spectrum slicing or time-division multiplexing can be used for transmission in the up direction (see FIG. 10.8d, e in Document 2).

DWA-PON is a technology to dynamically assign wavelengths to be used in a system where a plurality of PONs are integrated. DWA-PON is disclosed, for example, in the following Document 3. In the case of the optical communication network shown in FIG. 1 of Document 3, four types of wavelengths are dynamically assigned to 4×16 ONUs of four systems of PONs.

Document 3: Yu-Li Hsuch, et al: "Success-DWA: A Highly Scalable and Cost-Effective Optical Access Network", IEEE Optical Communications, August 2004, S 24-S30

GE-PON (see FIG. 13) uses the time-division multiplexing system as described above. Therefore in GE-PON, a transmitter and a receiver in OLT need not be installed in each corresponding ONU, but only one transmitter and one receiver are required. Therefore in GE-PON, the equipment scale of the telephone station can be decreased, which is an advantage.

However in GE-PON where one wavelength is assigned to all the subscribers (e.g. 32), the communication speed per subscriber decreases as the number of subscribers (that is the number of ONUs) who simultaneously communicate increases. On the other hand, increasing the communication speed of one wavelength has a limitation, due to such a reason as receive sensitivity. So the transmission assurance band of GE-PON is narrow, which is a disadvantage.

On the contrary, WDM-PON (see FIG. 14) uses different wavelength channels depending on the ONU. Therefore, transmission bands do not change according to the change in number of subscribers who perform communication simultaneously. As a result, sufficiently large transmission bands can be assured.

However in WDM-PON, the wavelength to be used is different depending on the ONU to be accommodated. Therefore the same number of transmitters and receivers as the number of ONUs must be installed in OLT. As a result, in WDM-PON, the equipment in the telephone station reaches a large scale and is expensive, which is a disadvantage.

Also in the case of WDM-PON, the wavelength is fixed for each subscriber. Therefore the optical telephone station must manage information on the wavelength assigned to each subscriber for each PON. This increases the management cost of WDM-PON.

WDM-PON uses an AWG (Arrayed Wave Guide) type optical multiplexer/demultiplexer. In AWG, the dependence of wavelength on temperature is high (0.011 nm/° C.), and 1° C. or less of precise temperature management, for example, is required. This makes the management cost of WDM-PON high. Whereas if an interference film type WDM (Wavelength Division Multiplexing) filter is used, then temperature management is unnecessary. However the number of wavelengths that can be realized by interference film type WDM filter technologies is limited. WDM-PON sometimes needs 32 or more branches. This means that it is virtually impossible to perform wavelength demultiplexing equal as WDM-PON by using interference film type WDM filter technologies.

DWA-PON can flexibly distribute the transmission band among a plurality of PONs by dynamically assigning the optical wavelengths. Therefore in the case of DWA-PON, the transmission bands can be substantially spread while suppressing the increase of equipment cost and management cost.

However in DWA-PON, only one type of wavelength can be simultaneously assigned to one ONU, which restricts flexibility and transmission efficiency when the transmission band is allocated.

SUMMARY OF THE INVENTION

It is an object of the present invention to provide an optical communication network with sufficiently wide transmission bands at low cast and using small scale equipment.

An optical communication network according to a first aspect of the present invention comprises: a transmission system for generating optical transmission signals by performing wavelength-division multiplexing on a plurality of types of time-division multiplexed optical signals by assigning a plurality of series of signal strings to optical wavelengths which are fewer than the number of the signal strings for each signal unit constituting the signal string; an optical communication path for propagating the optical transmission signal which is output from the transmission system; and a receive system for restoring the signal unit by performing wavelength demultiplexing and time demultiplexing of the optical transmission signals which are input from the optical communication path, and restoring the plurality of series of signal strings by rearranging the signal unit.

An optical communication network according to a second aspect of the present invention comprises: a plurality of subscriber terminal device having a subscriber transmitter which outputs a corresponding signal string at a timing with an optical wavelength provided by a control signal for each signal unit; an optical coupler for generating a time-division multiplexed signal, for which wavelength-division multiplexing has been performed, by superimposing light waves which are output from the subscriber terminal devices respectively, and outputting it as an optical transmission signal; an optical communication path for propagating the optical transmission signal which is output from the transmission system; and a station terminal device having a station receiver for restoring the signal unit by performing wavelength demultiplexing and time demultiplexing of the optical transmission signals which are input from the optical communication path, and restoring the plurality of series of signal strings by rearranging the signal unit.

According to the optical communication network of the present invention, the optical wavelength and the output timing of the optical signal string are controlled for each optical signal string. Therefore the optical signal string is multiplexed using a multiplexing system combining time-division multiplexing and wavelength-division multiplexing. By this, flexibility and transmission efficiency when the transmission band is assigned can be improved more than those of TDM-PON and WDM-PON.

According to the optical communication network of the present invention, the total number of optical wavelengths to be used can be less than the total number of subscriber terminal devices. Therefore the equipment scale and equipment cost of the optical communication network according to the present invention can be less than those of WDM-PON.

BRIEF DESCRIPTION OF THE DRAWINGS

Other objects and advantages of the present invention will be described with reference to the drawings herein below.

FIG. 10 is a conceptual diagram depicting the communication principle of the optical communication network according to the second embodiment;

DESCRIPTION OF THE PREFERRED EMBODIMENTS

Figure 1:
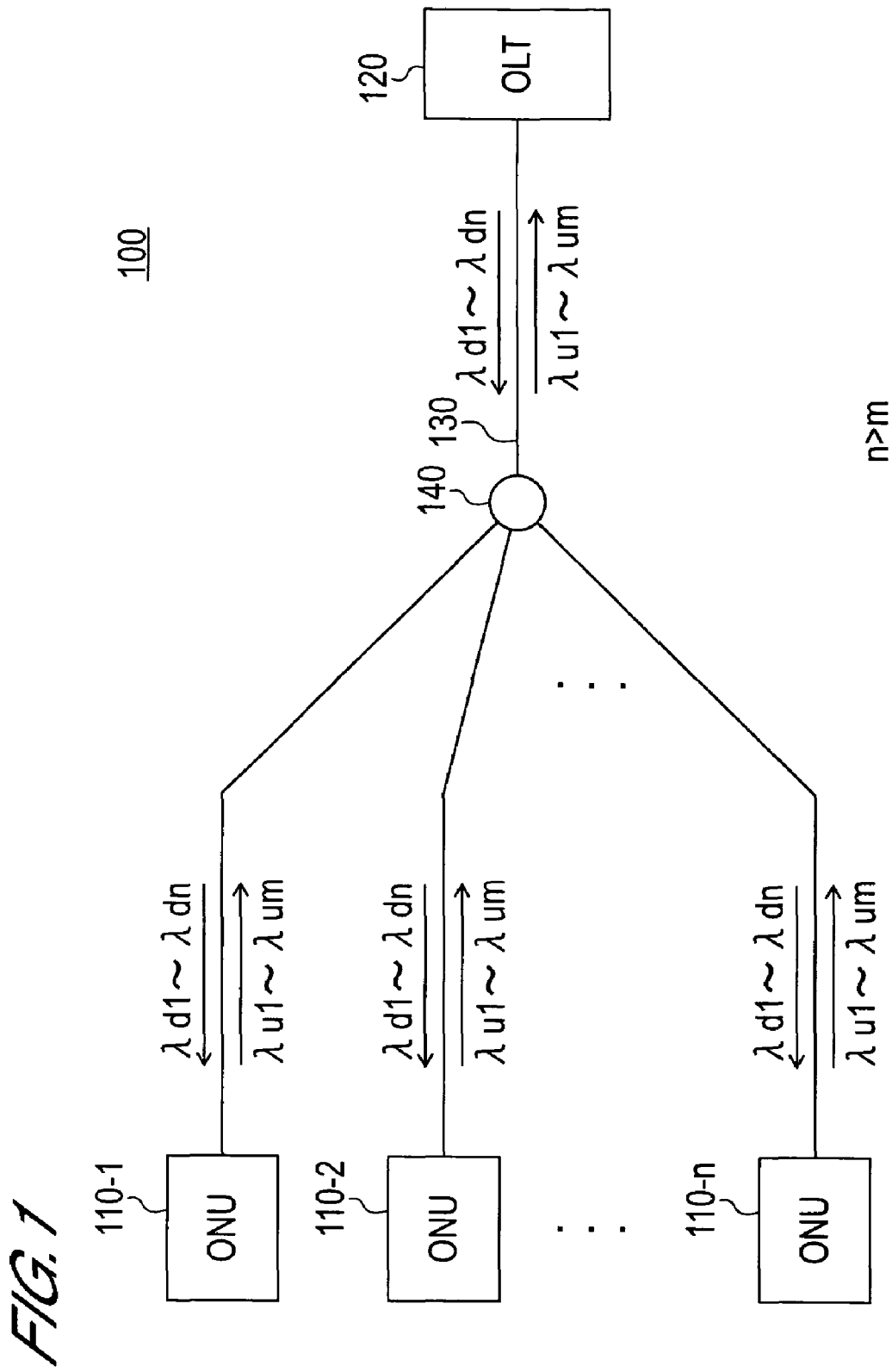
FIG. 1 is a diagram depicting a general configuration of the optical communication network according to the first embodiment.

Embodiments of the present invention will be described with reference to the drawings. In the drawings, the size, shape and positional relationship of each composing element is merely for assisting in understanding the present invention, and numerical conditions described below are merely examples.

First Embodiment

The optical communication network according to the first embodiment will be described with reference to FIG. 1-FIG. 7.

The optical communication network according to the present embodiment uses the communication system according to the present invention, that is a multiplexing system combining a time division multiplexing and wavelength division multiplexing, as the access in the up direction. Hereafter the communication system according to the present invention is called the λ-TDMA system. A conventional WDM system is used for the communication in the down direction.

FIG. 1 is a diagram depicting a general configuration of the optical communication network according to the present embodiment. As FIG. 1 shows, the optical communication network 100 of the present embodiment has the PON structure, and comprises ONUs 110-1-110-$n$, OLT 120, optical fiber 130 and optical coupler 140.

The ONUs 110-1-110-$n$ are subscriber side terminal devices of the optical communication network 100 respectively, and are normally installed in the home of each subscriber. The communication terminal (not illustrated), such as a personal computer, is connected to each ONU 110-1-110-$n$. The ONUs 110-1-110-$n$ according to the present embodiment output optical burst signals using m types of optical wavelengths λu1, λu2, ... λum respectively during transmission (that is during communication in the up direction). Here the number of optical wavelengths "m" is plural, and is a value smaller than the number of ONUs 110-1-110-$n$, that is "n". This means that $m \geq 2$ and $n \geq 3$. Therefore the number of optical wavelengths m used for the present embodiment is less than that of WDM-PON (the number of optical wavelengths to be used is the same as the number of ONUs, as mentioned above). During receiving (that is during communication in the down direction), on the other hand, wavelength demultiplexing is performed on the received optical signals with wavelengths λd1, λd2, ... λdn, just like the case of WDM-PON, so as to acquire the optical signal string with a wavelength corresponding to this ONU. The internal configuration of the ONUs 110-1-110-$n$ will be described later with reference to FIG. 2.

The OLT 120 is a telephone station side terminal device of the optical communication network 100, and is normally installed in a telephone station building. The OLT 120 is connected to another network, such as the Internet or a local IP network. The OLT 120 according to the present embodiment performs wavelength demultiplexing on the received optical signals (wavelengths λu1-λum) during receiving (that is during communication in the up direction), and performs time demultiplexing on the optical signals of each wavelength path to restore the optical signal string. During transmission (that is during communication in the down direction), optical signal strings with wavelengths λd1-λdn, which are predetermined for each ONU 110-1-110-$n$, are generated, and these optical signal strings are wavelength-multiplexed and output, just like WDM-PON. The internal configuration of the OLT 120 will be described later with reference to FIG. 3.

The optical fiber 130 includes a cable which physically connects the OLT 120 to the optical coupler 140 and cables which physically connect the optical coupler 140 to each ONU 110-1-110-$n$, for communication.

The optical coupler 140 directly branches the optical burst signals with wavelengths λd1-λdn, which are received from the OLT 120, and sends them to each ONU 110-1-110-$n$. Also the optical coupler 140 directly superimposes the optical burst signals with wavelengths λu1-λum, which are received from each ONU 110-1-110-$n$, and sends them to the OLT 120.

Figure 2:
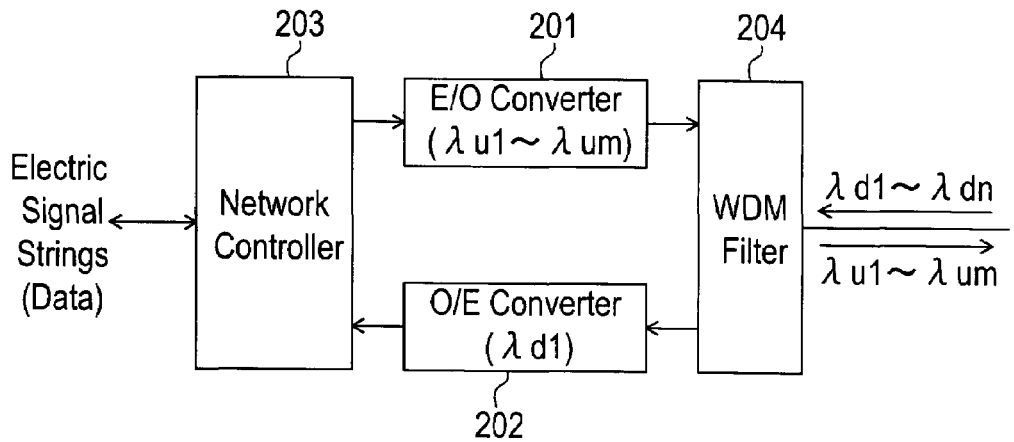
FIG. 2 is a block diagram depicting the internal configuration of the subscriber side terminal device according to the first embodiment.

FIG. 2 is a block diagram depicting the internal configuration of the ONU 110-1. As FIG. 2 shows, the ONU 110-1 according to the present embodiment comprises an electric/optical converter 201, optical/electric converter 202, network controller 203 and WDM (Wavelength Division Multiplexing) filter 204.

The electric/optical converter 201 has a wavelength selective light source (not illustrated) for outputting lights with m types of wavelengths λu1-λum. For the wavelength selective light source, a DBR (Distributed Bragg Reflector) laser or a DFB (Distributed Feedback) array laser, for example, can be used. The electric/optical converter 201 converts the electric signal strings, which are input from the outside, into optical signal strings using this wavelength selective light source, and outputs them to the WDM filter 204. The optical wavelength of the optical signal strings generated by the electric/optical converter 201 and the output timing thereof are controlled by the network controller 203.

The optical/electric converter 202 inputs the optical burst signals from the WDM filter 204, extracts signals with the wavelength λd1 which corresponds to the ONU 110-1 from the optical burst signals, converts the exacted signals to electric signal strings, and sends them to the network controller 203.

The network controller 203 regenerates the data to be sent to the communication terminal and the transmission permission signals from the electric signal strings received from the optical/electric converter 202. The network controller 203 also controls the optical wavelengths and output timings of the optical signal strings generated in the electric/optical converter 201 based on the regenerated transmission permission signals (details will be described later).

The WDM filter 204 is an interference film type WDM filter, for example, or a variable wavelength filter for selecting and allowing to pass only an arbitrary wavelength from the input light. The WDM filter 204 allows to pass only wavelengths λu1-λum from the lights which are input from the electric/optical converter 201, and separates the light which is input from the optical coupler 140 into wavelengths λd1-λdn.

The configuration of the other ONUs 110-2-110-$n$ is also the same as the configuration of the ONU 110-1, except for the optical wavelength to be extracted by the optical/electric converter 202.

Figure 3:
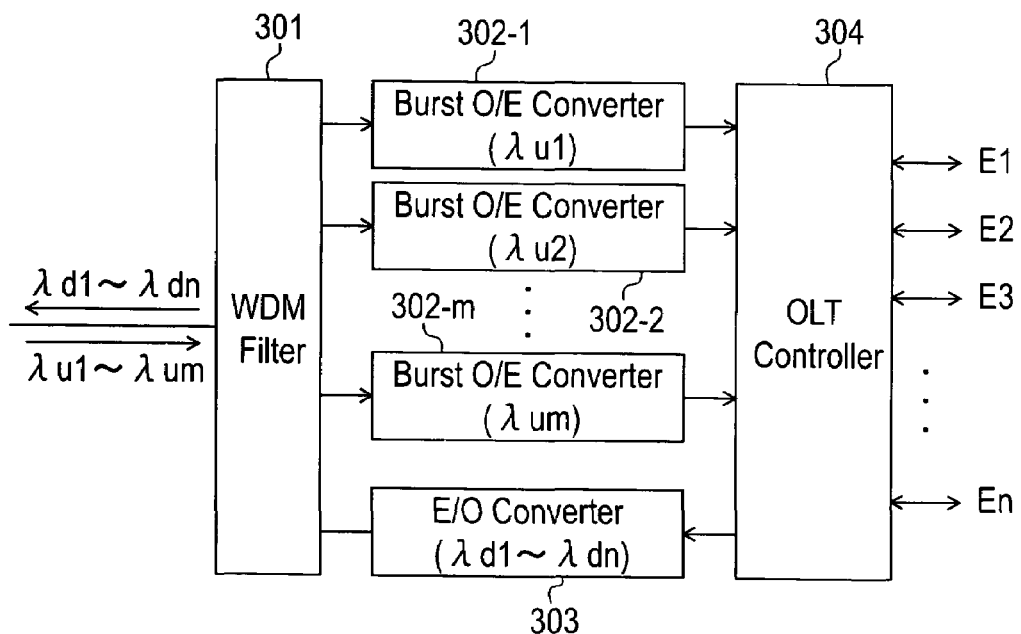
FIG. 3 is a block diagram depicting the internal configuration of the station side terminal device according to the first embodiment.

FIG. 3 is a block diagram depicting the internal configuration of the OLT 120. As FIG. 3 shows, the OLT 120 according to the present embodiment comprises a WDM filter 301, burst optical/electric converters 302-1-302-$m$, electric/optical converter 303 and OLT controller 304.

The WDM filter 301 separates the light which is input from the optical coupler 140 into wavelengths λu1-λum, and allows to pass only the wavelengths λd1-λdn out of the light which is input from the electric/optical converter 303.

The burst optical/electric converters 302-1-302-*m* input the light with the corresponding wavelength (e.g. wavelength λu1 in the case of the burst optical/electric converter 302-1) from the WDM filter 301, and convert it into electric signal strings. The burst optical/electric converters 302-1-302-*m* are different from normal optical/electric converters since electric signal strings, where the time dispersion and the optical amplitude dispersion of the optical burst signals are corrected, can be generated. These electric signal strings are sent to the OLT controller 304.

The electric/optical converter 303 converts the electric signal strings which are input from the OLT controller 304 into the optical signal strings with the wavelength corresponding to the ONU at the transmission destination (e.g. wavelength λd1 in the case of ONU 110-1), and sends them to the WDM filter 301.

The OLT controller 304 regenerates the signal strings E1-Em corresponding to each ONU 110-1-110-*n* (see FIG. 1) from each electric signal strings which are input from the burst optical/electric converters 302-1-302-*m* (details will be described later). A regenerated signal strings are converted into a predetermined format (e.g. ATM (Asynchronous Transfer Mode) frame) when necessary, and are sent to the communication network in a subsequent step. Also the OLT controller 304 converts the communication data received from the communication network in a subsequent step and the transmission admission signals generated internally into a predetermined format (e.g. Ethernet™ frame) when necessary, and sends them to the electric/optical converter 303.

Now the operation of the optical communication network 100 shown in FIG. 1-FIG. 3 will be described with reference to FIG. 4-FIG. 7.

Figure 4:
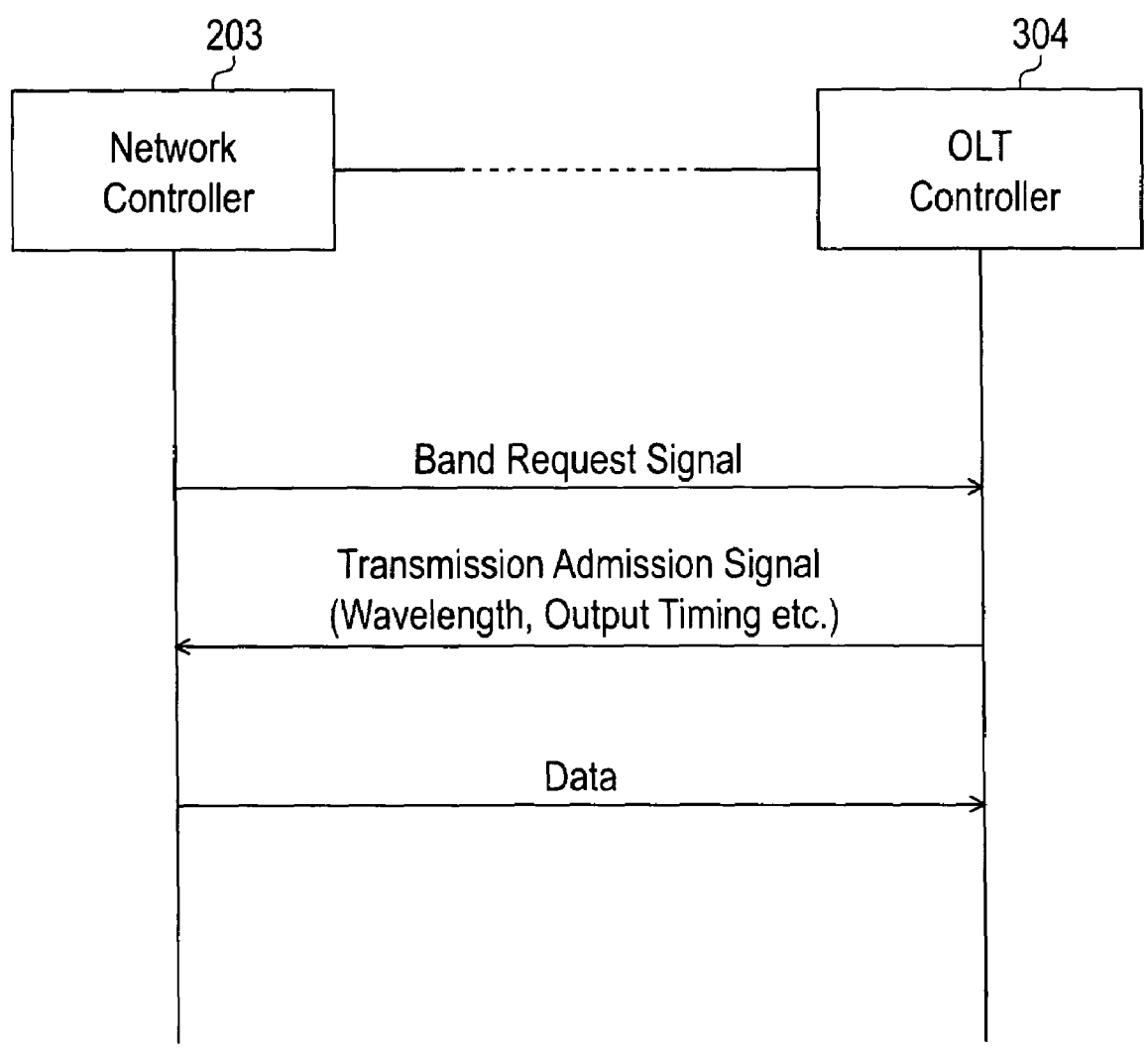
FIG. 4 is a conceptual diagram depicting the communication principle of the optical communication network according to the first embodiment.

FIG. 4 is a conceptual diagram depicting the communication system in the up direction of the optical communication network 100 according to the present embodiment, that is λ-TDMA system.

As FIG. 4 shows, when data transmission in the up direction is performed, a band request signal is sent from the network controller 203 of the ONU, which performs this data transmission, to the OLT 120.

The band request signal received by the OLT 120 reaches the OLT controller 304 via the WDM filter 301 and the burst optical/electric converters 302-1-302-*n*. The OLT controller 304 calculates the wavelength and the output timing for the optical burst signals which are output by each ONU 110-1-110-*n* based on the band request signal received from each ONU 110-1-110-*n*, and generates the transmission admission signal including this wavelength and timing. The transmission admission signals are sent to the corresponding ONU via the electric/optical converter 303 and WDM filter 301.

A transmission admission signal received by the corresponding ONU is sent to the network controller 203 via the WDM filter 204 and the optical/electric converter 202. The network controller 203 takes out such information as the wavelength to be used and the output timing from this transmission admission signal. And this network controller 203 controls the electric/optical converter 201 based on the extracted information, and transfers the data.

Figure 5:
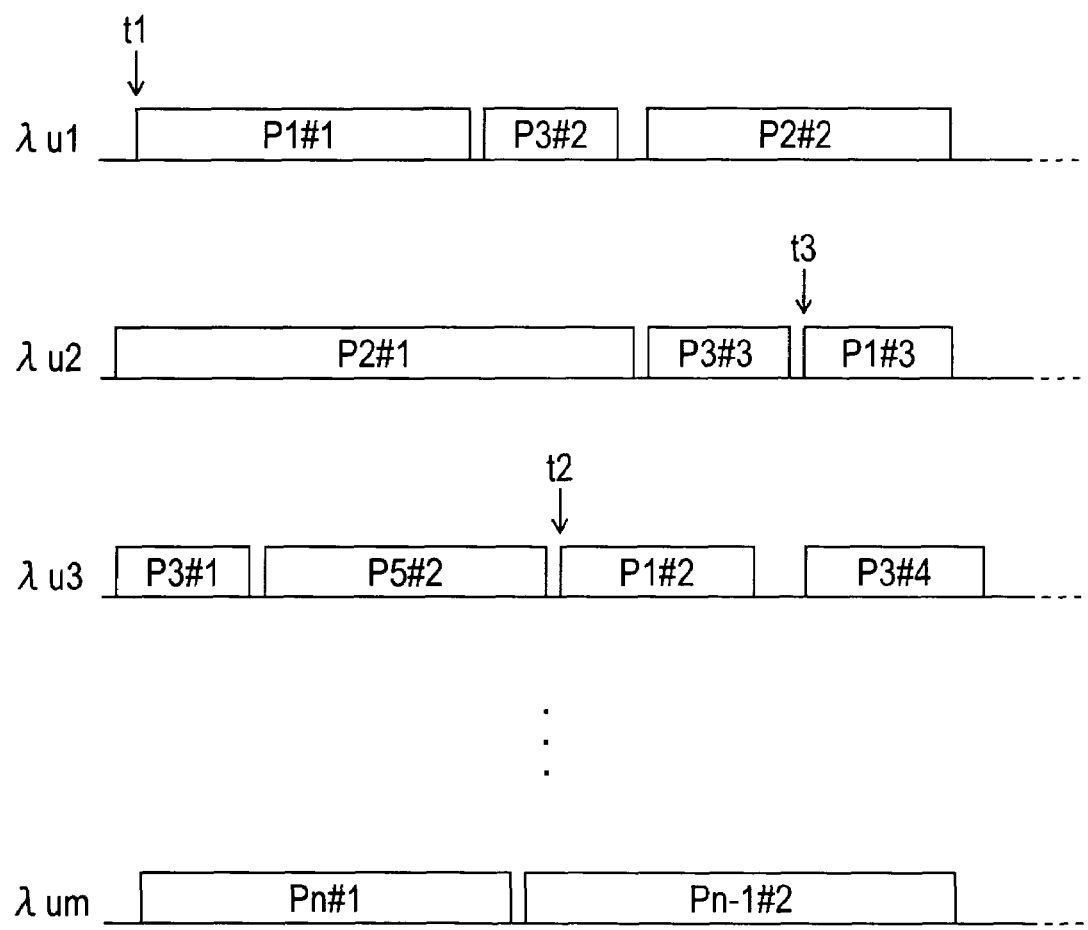
FIG. 5 is a conceptual diagram depicting the communication principle of the optical communication network according to the first embodiment.

FIG. 5 is a conceptual diagram depicting an example of the optical signal strings multiplexed by the λ-TDMA system of the present embodiment. In FIG. 5, P1-Pn are the optical burst signals which are output from the ONUs 110-1-110-*n* respectively, and the numbers with # indicate the list sequences of the burst signals.

As FIG. 5 shows, according to the present embodiment, the optical wavelength selected by the electric/optical converter 201 and the output timing of this optical signal string are controlled for each one of the optical burst signals. For example, the first optical burst signal P1#1, in the optical burst signals P1 to be output by the ONU 110-1, uses the optical wavelength λu1, and the second optical burst signal P1#2 uses the optical wavelength λu3, and the third optical burst signal P1#3 uses the optical wavelength λu2. The wavelength to be used for transmission is set such that the best transmission efficiency can be acquired according to the data length and the total data volume of each burst signal to be sent from each ONU 110-1-110-*n*. The output timings t1, t2 and t3 of the optical burst signal P1#1, P1#2 and P1#3 are set so as not to collide when these optical burst signals P1#1, P1#2 and P1#3 are superimposed on other optical burst signals in the optical coupler 140. For example, the output timing t2 of the burst signal P1#2 is set such that this burst signal P1#2 does not collide with other burst signals P5#2, P3#4, etc. which use the same optical wavelength λu3. By this, optical signals, where both time division multiplexing and wavelength division multiplexing have been performed, can be sent to the OLT 120.

Figure 6:
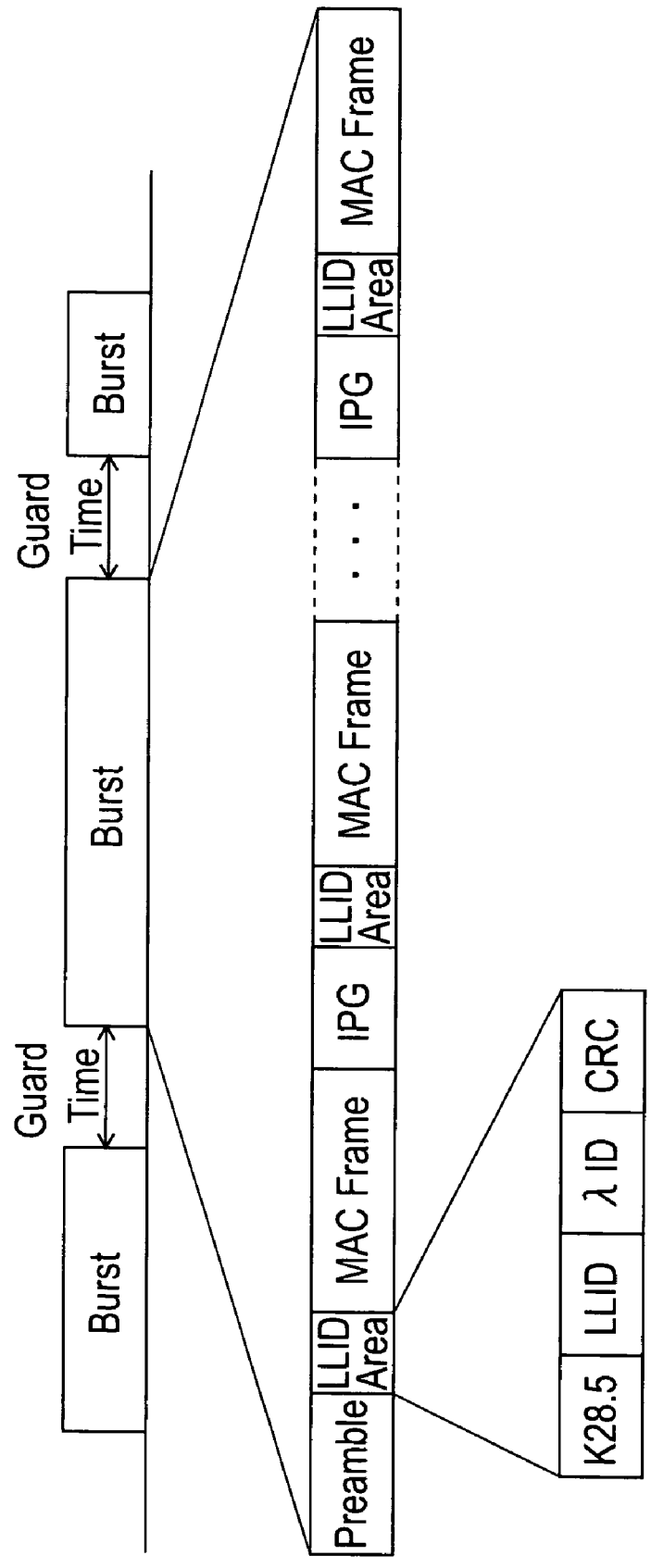
FIG. 6 is a conceptual diagram depicting the communication principle of the optical communication network according to the first embodiment.

FIG. 6 is a conceptual diagram depicting the format of the optical burst signal to be sent from the ONUs 110-1-110-*n*.

As FIG. 6 shows, in each wavelength channel of communication in the up direction, optical burst signals are sequentially sent with a predetermined guard time (no signal section) as an interval. And at the beginning of the optical burst signal, a preamble signal for synchronization is attached, then an LLID (Logical Link Identification) area, a MAC frame and IPG (Internet Packet Gap: a signal, to recognize the boundary between a MAC frame and subsequent LLID area), are repeatedly inserted. The LLID area includes the special code K28.5, LLID, λID and CRC (Cyclic Redundancy Check). Here LLID is a code to identify the ONUs 110-1-110-*n* of the transmission source. λID is a code to identify the wavelength used to transmit this optical burst signal. The LLID and the λID are stored in the above mentioned transmission admission signal, and are sent from the OLT 120 to the ONUs 110-1-110-*n*, and are then stored in the optical burst signal and returned from the ONUs 110-1-110-*n* to the OLT 120. By this, the OLT 120 can recognize the correspondence between the permission of uses of a band and the received optical burst signal.

Figure 7:
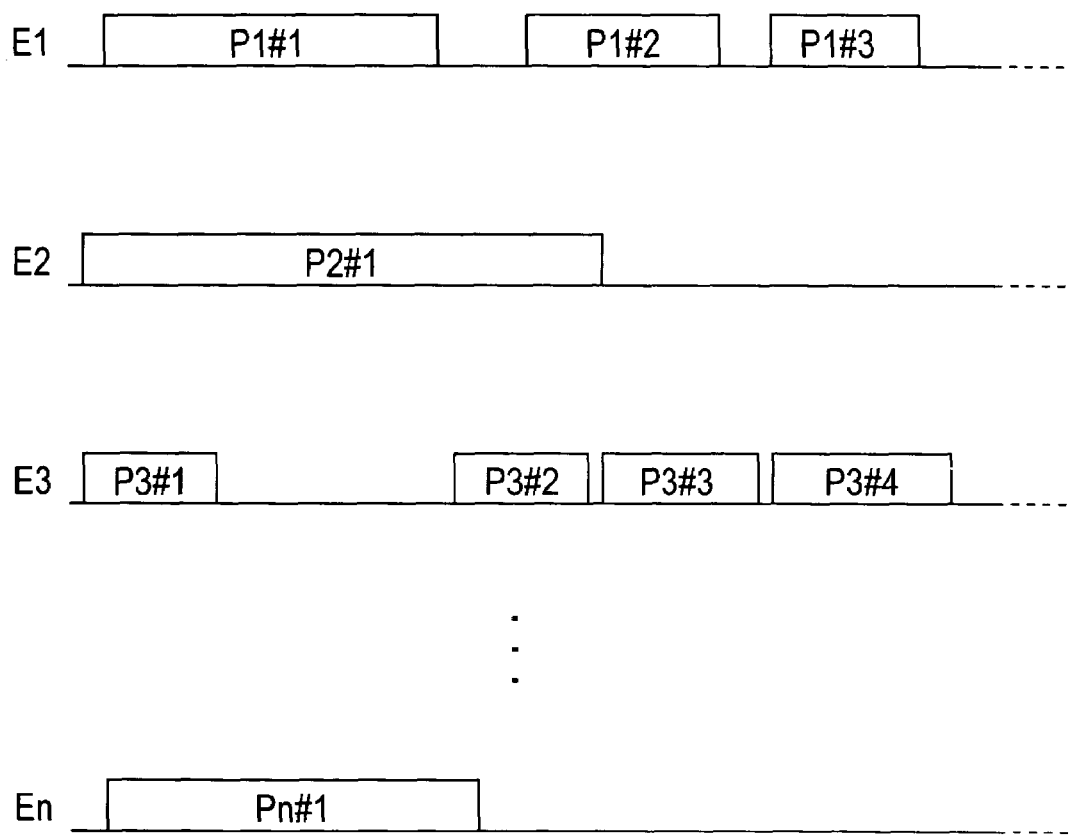
FIG. 7 is a conceptual diagram depicting the communication principle of the optical communication network according to the first embodiment.

FIG. 7 is a conceptual diagram for describing the operation of the OLT 120.

As FIG. 5 shows, for the optical signal to be input to the OLT 120, both time-division multiplexing and wavelength-division multiplexing have been performed. Wavelength-demultiplexing is performed on these optical signals by the WDM filter 204, and converted into electric signal strings by the burst optical/electric converters 302-1-302-*m*, and input to the OLT controller 304. As FIG. 7 shows, the OLT controller 304 rearranges these electric signal strings into the electric signal strings E1-En for each of the corresponding ONUs 110-1-110-*n* using LLID and λID (see FIG. 6). The regenerated signal strings are format-converted when necessary, and are sent to the communication network (e.g. local IP network) in a subsequent stage.

The transmission in the down direction is the same as the down transmission of an normal WDM-PON, so description thereof is omitted.

As described above, the optical communication network 100 according to the present embodiment uses a plurality of wavelength channels. Therefore compared with TDM-PON, a wide transmission band can be secured even if many subscribers communicate simultaneously.

Also in the case of the optical communication network 100 according to the present embodiment, the number of wavelengths to be used is smaller than the number of subscribers (that is the number of ONUs), so compared with WDM-PON (that is, a system of which the number of wavelengths to be used is the same as the number of ONUs), the circuit scale of the OLT 120 (e.g. number of burst optical/electric converters 302-1-302-*m*) can be decreased. Therefore in the optical communication network 100 of the present embodiment, the scale and price of equipment in the telephone station can be decreased compared with WDM-PON.

Also in the case of the optical communication network 100 of the present embodiment, the wavelength is not fixed for each subscriber, so the optical communication network management company need not manage information on the wavelengths assigned to each subscriber for each PON. Therefore in the optical communication network 100 of the present embodiment, the management cost is inexpensive compared with WDM-PON.

Also in the case of the optical communication network 100 of the present embodiment, the number of wavelengths to be used can be decreased compared with WDM-PON. Therefore in the optical communication network 100 of the present embodiment, the interference film type WDM filters 204 and 301 can be used instead of the AWG filter used for WDM-PON. So in the optical communication network 100, temperature management is unnecessary, which can decrease the management cost.

Additionally, according to the optical communication network 100 of the present embodiment, all the ONUs 110-1-110-*n* can use all the wavelengths $\lambda u1$-$\lambda um$ for up transmission, so the transmission band used by each ONU 110-1-110-*n* can be flexibly assigned according to the length of the optical burst signals, for example. Therefore compared with DWA-PON, the optical communication network 100 of the present embodiment can further improve flexibility and transmission efficiency of the transmission band assignment.

According to the present embodiment, all the ONUs 110-1-110-*n* are constructed to support a $\lambda$-TDMA system, but a TDMA type ONU (an ONU which outputs optical burst signals at a timing provided by the band request signal using a fixed optical wavelength) or a fixed optical wavelength type ONU (an ONU which outputs optical burst signals at an arbitrary timing using a fixed optical wavelength which is different from the optical wavelength used by ONUs 110-1-110-*n*) may be included as a part of ONUs. A $\lambda$-TDMA system is a multiplexing system combining time-division multiplexing and wavelength-division multiplexing. Therefore a $\lambda$-TDMA system can easily support a TDMA and fixed wavelength system. As a result, TDMA and/or a fixed wavelength type ONU and $\lambda$-TDMA type ONUs 110-1-110-*n* can easily coexist.

Second Embodiment

The optical communication network according to the second embodiment of the present invention will now be described with reference to FIG. 8-FIG. 10.

In the present embodiment, the ONUs and the OLT are constructed such that each ONU can use a plurality of wavelengths simultaneously.

The general configuration of the optical communication network according to the present embodiment is the same as that of the first embodiment (see FIG. 1), so description thereof is omitted.

Figure 8:
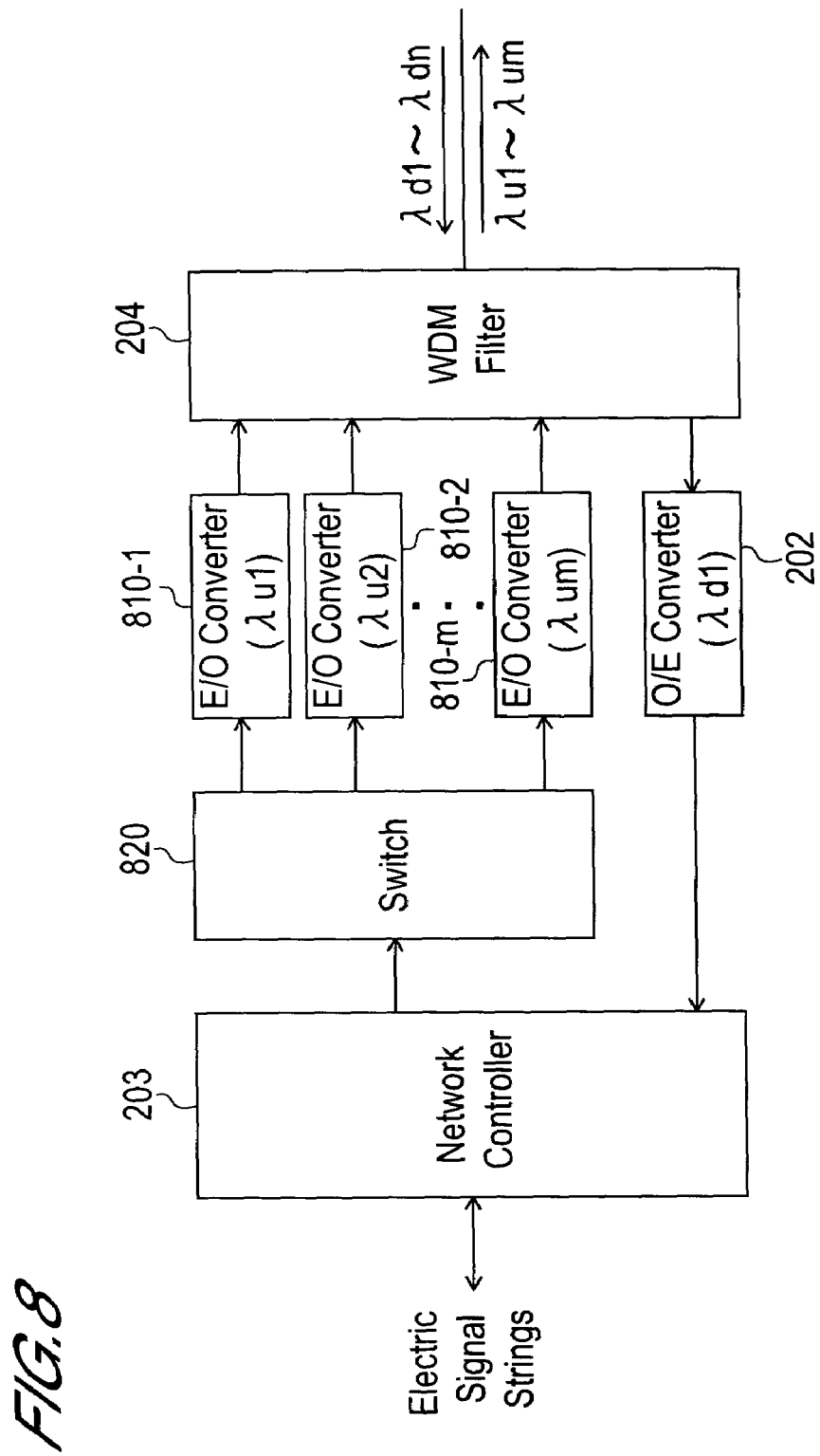
FIG. 8 is a block diagram depicting the internal configuration of the subscriber side terminal device according to the second embodiment.

FIG. 8 is a block diagram depicting the internal configuration of the ONU according to the present embodiment. In FIG. 8, the composing elements denoted with the same reference symbols as FIG. 2 are the same as those in FIG. 2. As FIG. 8 shows, the ONU according to the present embodiment comprises the electric/optical converters 810-1-810-*m* and the switch 820.

The electric/optical converters 810-1-810-*m* have a fixed wavelength light source (not illustrated) which outputs light with the corresponding wavelength respectively in the m types of wavelengths $\lambda u1$-$\lambda um$. Using this light source, the electric/optical converters 810-1-810-*m* convert electric signal strings, which are output from the switch 820, into optical signal strings, and outputs them to the WDM filter 204. Thus the present embodiment has an individual electric/optical converter 810-1-810-*m* for each wavelength, so that light with a plurality of types of wavelengths can be output in parallel. The optical wavelengths of the optical signal strings generated by electric/optical converters 810-1-810-*m* and the output timings thereof are controlled by the network controller 203.

The switch 820 distributes the electric signal strings, which are input from the outside, to the electric/optical converters 810-1-810-*m* based on the control of the network controller 203.

Figure 9:
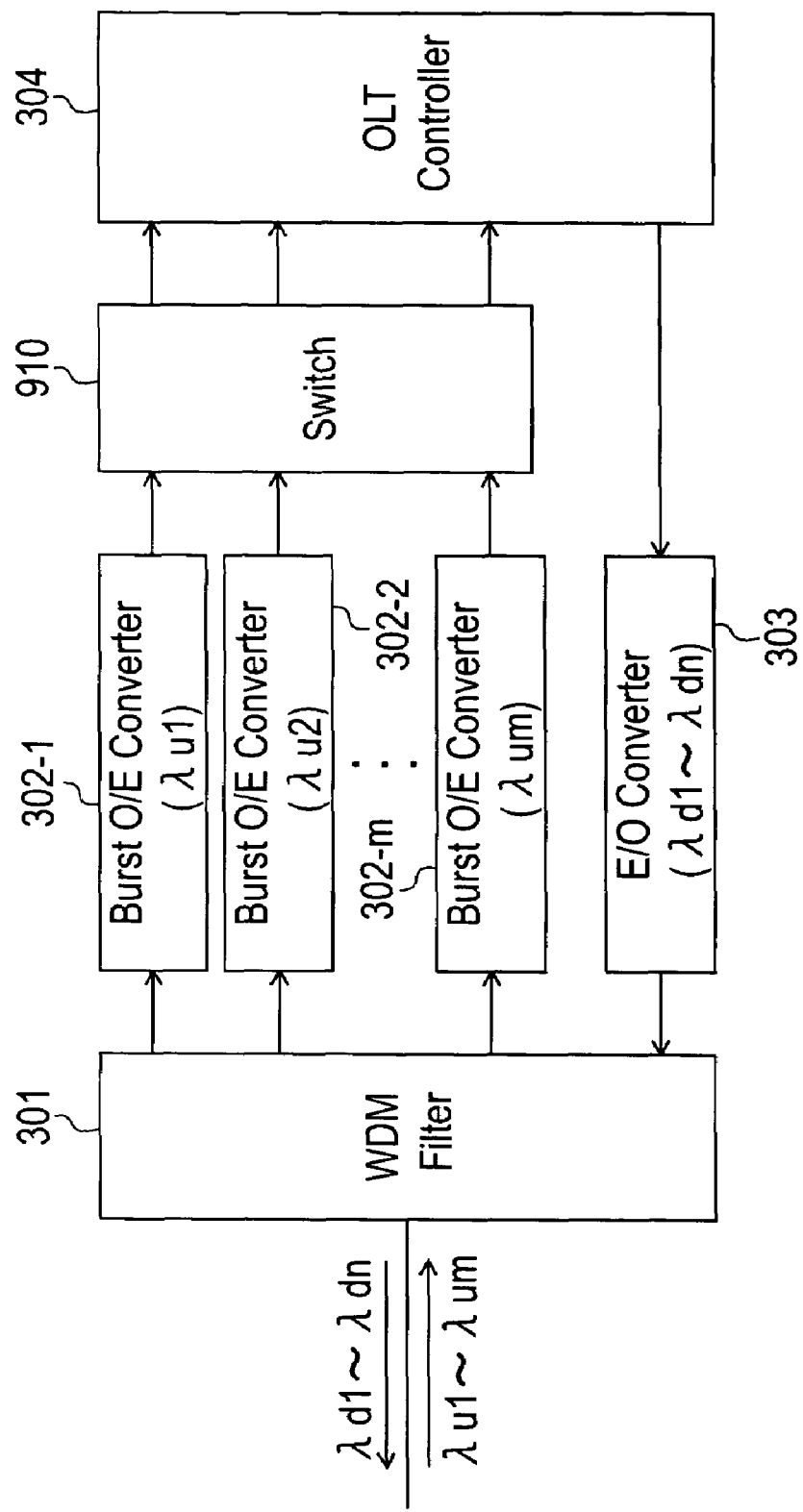
FIG. 9 is a block diagram depicting the internal configuration of the station side terminal device according to the second embodiment.

FIG. 9 is a block diagram depicting the internal configuration of the OLT according to the present embodiment. In FIG. 9, composing elements denoted with the same reference symbols as FIG. 3 are the same as those in FIG. 3. As FIG. 9 shows, the OLT according to the present embodiment has a switch 910. The switch 910 rearranges the electric signal strings which are input from the burst optical/electric converters 302-1-302-*m*.

It is possible to use an inverse max instead of the switch 820, and an inverse demax instead of the switch 910. To use the inverse max and inverse demax, signal strings are distributed and rearranged using label signals.

FIG. 10 is a conceptual diagram depicting an example of the optical signal string multiplexed by the optical communication network of the present embodiment. In FIG. 10, P1-Pn are the optical burst signals which are output from the ONUs 110-1-110-*n* (see FIG. 1) respectively, and the number with # indicates the list sequence of the burst signal.

As FIG. 8 shows, the present embodiment has an individual electric/optical converter 810-1-810-*m* for each wavelength, so that lights with a plurality of types of wavelengths can be output in parallel. Therefore each ONU 110-1-110-*n* can use a transmission band wider than the bandwidth of one wavelength.

In the case of the above mentioned WDM-PON and DWA-PON, one subscriber can use only one type of wavelength simultaneously, so to expand the bandwidth to be used by a subscriber, the maximum transmission speed of the optical communication line used by the user must be increased. For this, new facility for high-speed optical communication must be constructed separately from conventional equipment. In the case of TDM-PON, such as GE-PON, the bandwidth to be used can be expanded if the band occupying rate granted to a specific subscriber is increased, but high-speed communication which exceeds the bandwidth of one wavelength cannot be provided to the subscriber. In the optical communication network according to the present embodiment, on the other hand, each ONU can output lights with a plurality of types of wavelengths in parallel. Therefore by increasing the band occupying rate granted to a subscriber by changing the control of the OLT controller 304, the band width to be used can be expanded using a conventional optical communication line, and also a transmission band wider than the bandwidth of one wavelength can be provided to a subscriber. Therefore according to the present embodiment, an increase of the transmission bandwidth requested by the subscriber can be supported flexibly at low cost while effectively using conventional facility.

A transmission band wider than TDM-PON can be secured even when many subscribers simultaneously communicate, equipment scale and cost can be decreased more than WDM-PON, and flexibility and transmission efficiency can be improved more than DWA-PON, which are the same as the first embodiment.

Third Embodiment

The optical communication network according to the third embodiment of the present invention will now be described with reference to FIG. 11 and FIG. 12.

In the present embodiment, a λ-TDMA system according to the present invention is applied to both the up and down directions.

Figure 11:
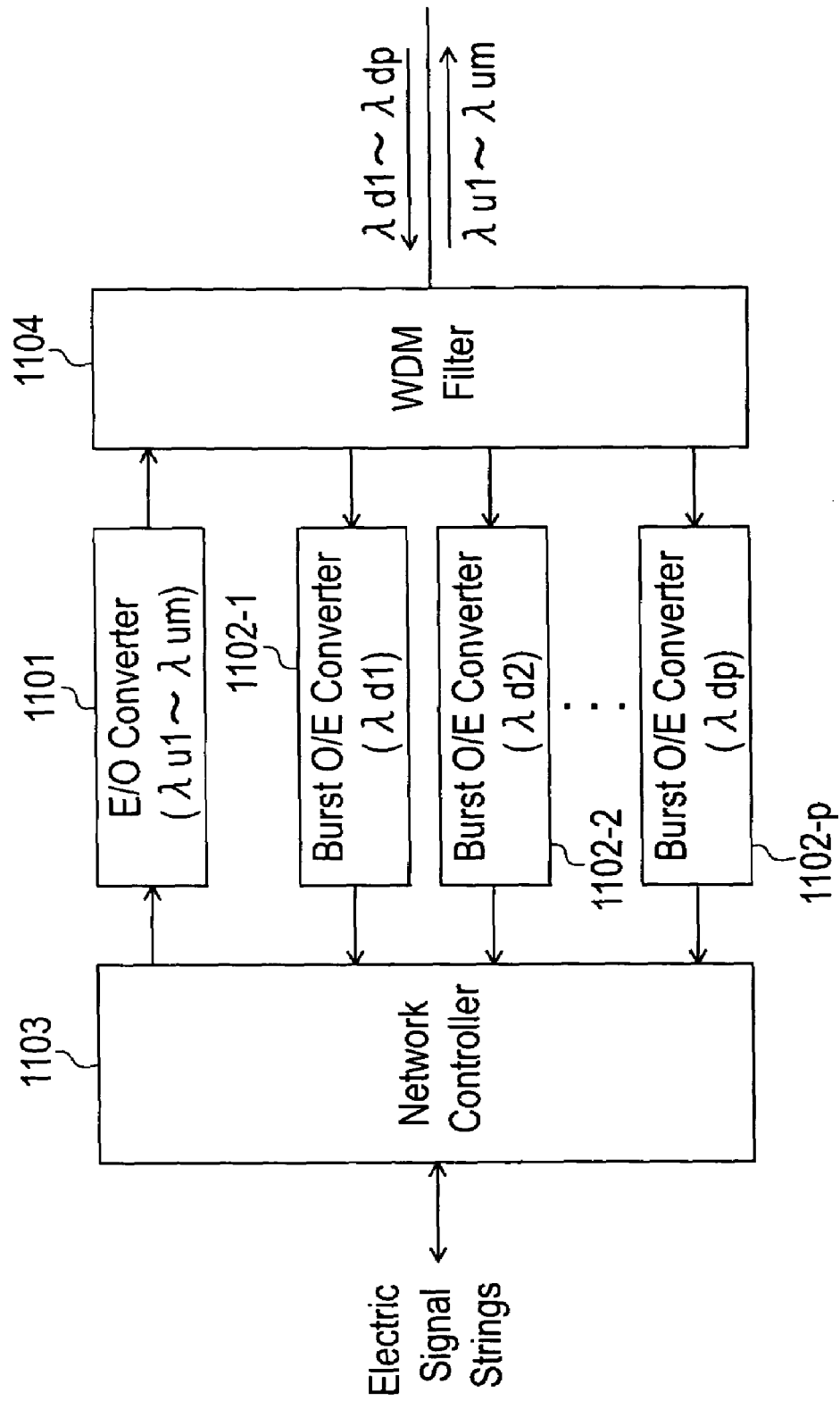
FIG. 11 is a block diagram depicting the internal configuration of the subscriber side terminal device according to the second embodiment.

FIG. 11 is a block diagram depicting the internal configuration of an ONU according to the present embodiment. As FIG. 11 shows, the ONU of the present embodiment comprises an electric/optical converter 1101, burst optical/electric converters 1102-1-1102-$p$, network controller 1103 and WDM filter 1104.

The electric/optical converter 1101 converts the electric signal strings into optical signal strings using the wavelength selective light source, which generates lights with m types of wavelengths λu1-λum, and outputs them to the WDM filter 1104. The optical wavelength and the output timing of the optical signal strings generated by the electric/optical converter 1101 are controlled by the network controller 1103.

The burst optical/electric converters 1102-1-1102-$p$ input the light with the corresponding wavelength (e.g. wavelength λd1 in the case of the burst optical/electric converter 1102-1) from the WDM filter 1104, and converts it into an electric signal strings. The number of wavelengths p may be a value the same as the number of wavelengths m to be used in the up direction, or may be a different value.

The network controller 1103 controls the optical wavelength and the output timings of the optical signal strings generated in the electric/optical converter 1101. Also the network controller 1103 time-division demultiplexes the electric signal strings received from the burst optical/electric converters 1102-1-1102-$p$, and regenerates the down signal strings addressed to its own ONU.

The WDM filter 1104 is an interference film type WDM filter, for example, which is the same as the WDM filter 204 of the first embodiment. The WDM filter 1104 passes the wavelengths λu1-λum from the lights which are input from the electric/optical converter 1101, and separates the light, which is input from the optical coupler 140, into the wavelengths λd1-λdp.

Figure 12:
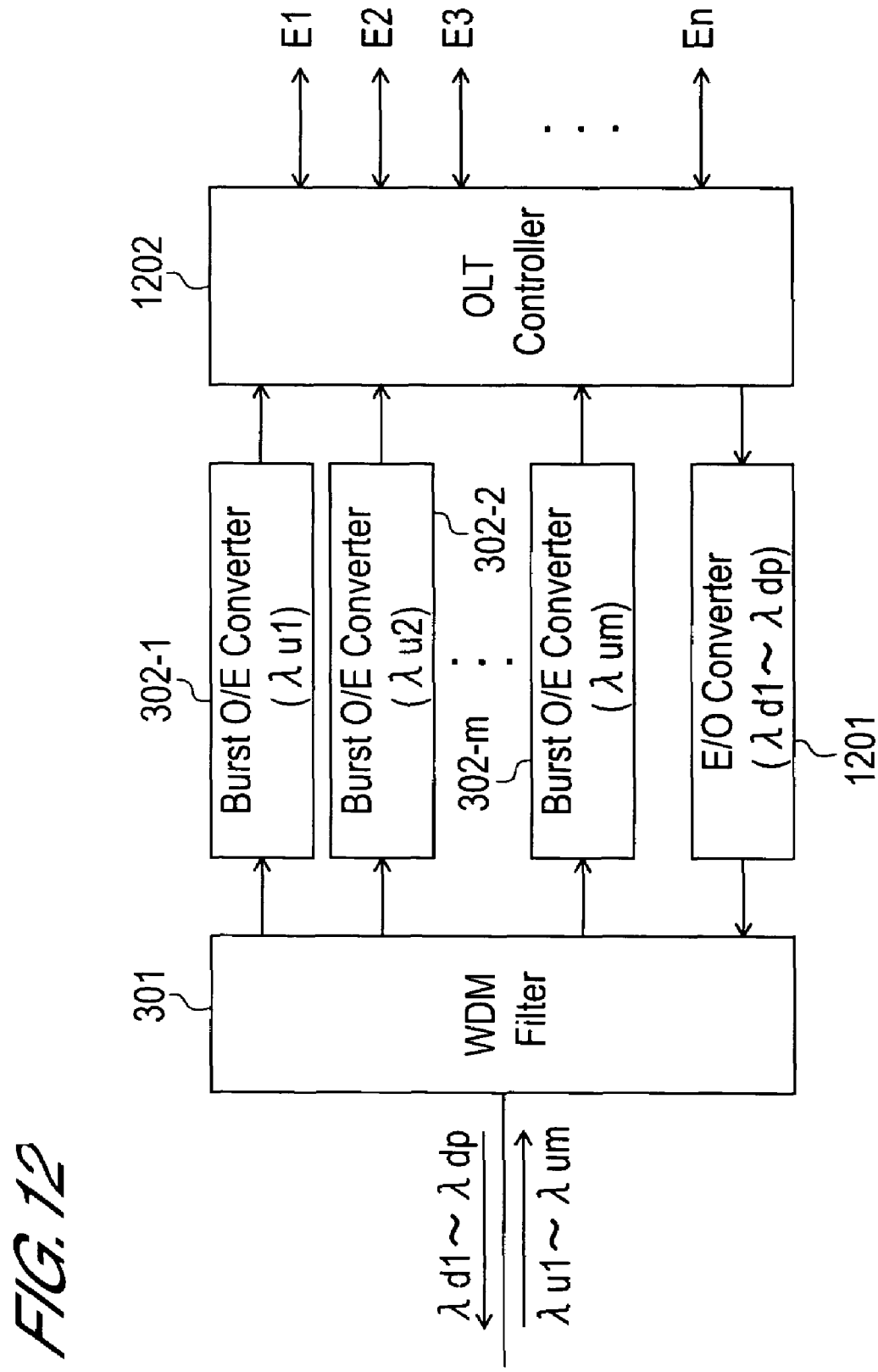
FIG. 12 is a block diagram depicting the internal configuration of the station side terminal device according to the second embodiment.
Figure 13:
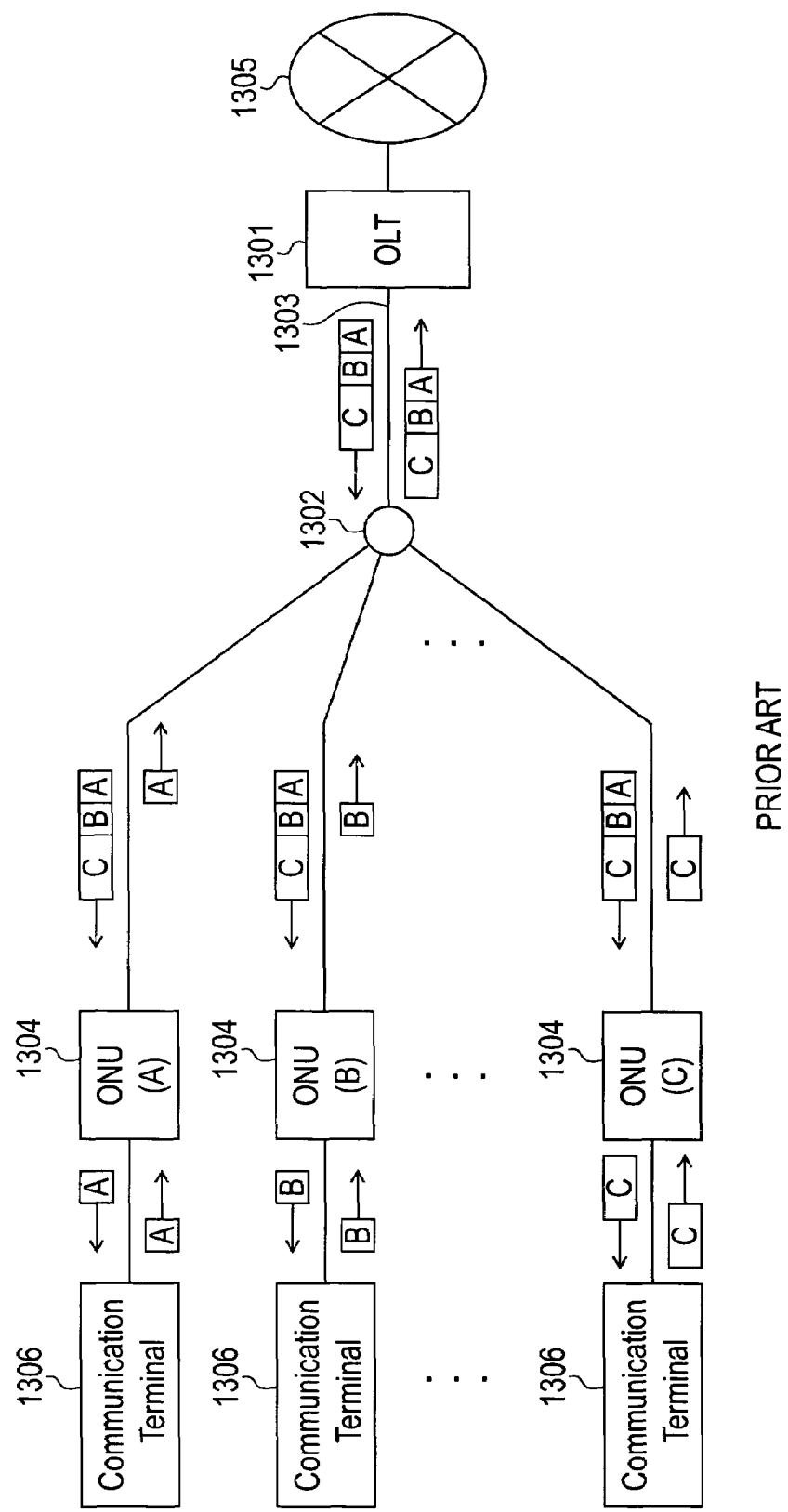
FIG. 13 is a conceptual diagram depicting the configuration of a conventional optical communication network.
Figure 14:
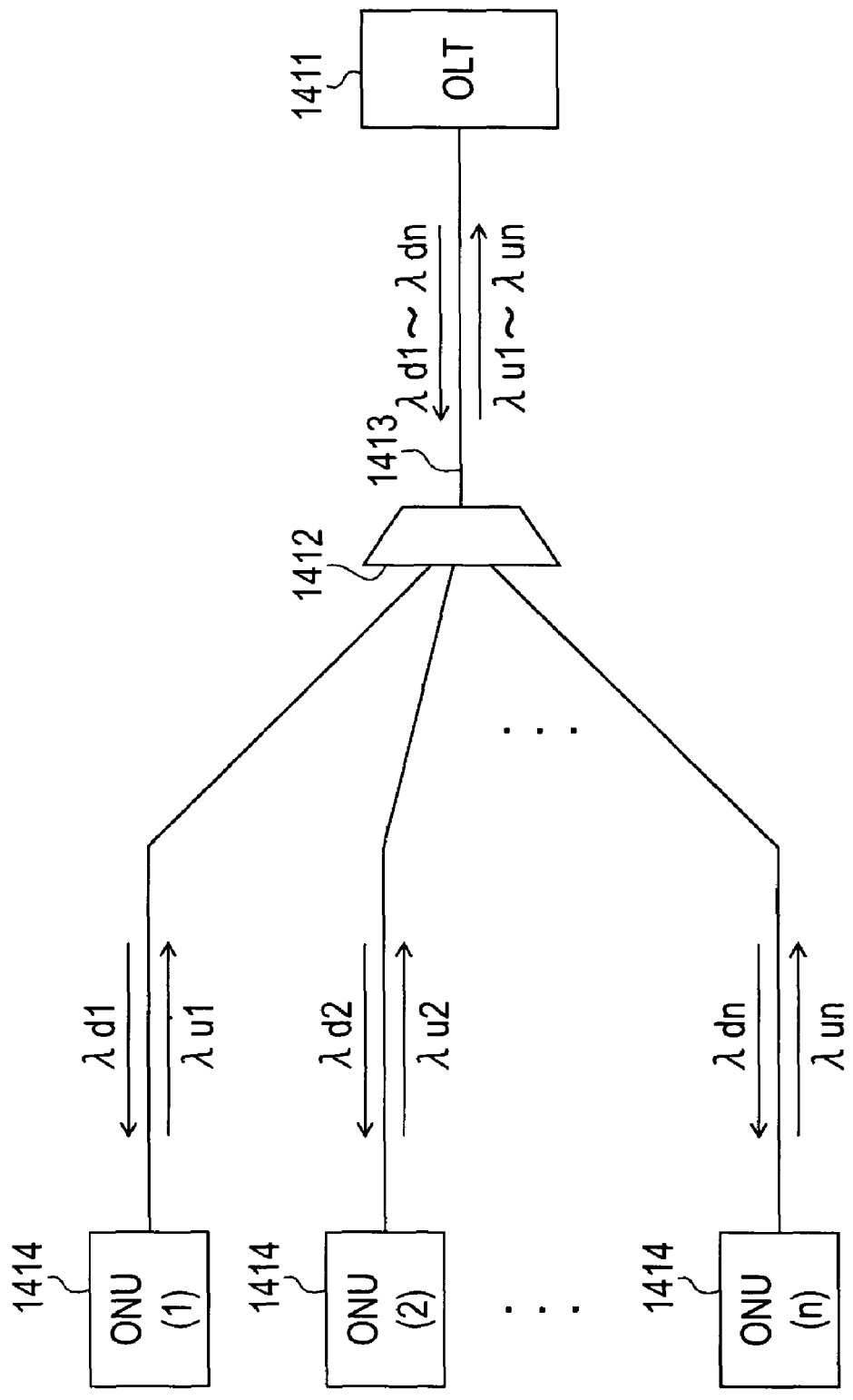
FIG. 14 is a conceptual diagram depicting the configuration of a conventional optical communication network.

FIG. 12 is a block diagram depicting the internal configuration of the OLT according to the present embodiment. In FIG. 12, composing elements with the same reference symbols as FIG. 3 are the same as those in FIG. 3.

The electric/optical converter 1201 has a wavelength selective light source (not illustrated) for outputting lights with p types of wavelengths λd1-λdp. The electric/optical converter 1201 performs wavelength-division multiplexing by converting a plurality of series of time-division multiplexed optical signals, which are output by the OLT controller 1202, into optical signal strings with different wavelengths λd1-λdp during communication in the down direction.

During the communication in the down direction, the OLT controller 1202 rearranges the signal strings E1-En for each burst light constituting each signal string. By this, the time-division multiplexed signal strings, which are fewer than the number of signal strings E1-En, are generated. These time-division multiplexed signal strings are output to the electric/optical converter 1201 in parallel. The OLT controller 1202 also regenerates the signal strings E1-En corresponding to each ONU 110-1-110-$n$ (see FIG. 1) from each of the electronic signal strings which are input from the burst optical/electric converters 302-1-302-$m$ during communication in the up direction.

The communication operation in the up direction of the optical communication network according to the present invention is the same as the communication in the up direction in the first embodiment. The communication operation in the down direction of the optical communication network according to the present embodiment is roughly the same as the communication in the up direction, except for the point that the network controller 1103 regenerates only the signal string corresponding to its own ONU.

According to the present embodiment, the λ-TDMA system is used not only for communication in the up direction, but also for communication in the down direction, so the same effect as the first embodiment can be implemented also for communication in the down direction. In other words, according to the present embodiment, in the communication in the down direction as well, a transmission band wider than TDM-PON can be secured when many subscribers simultaneously communicate, and facility scale and cost can be decreased more than WDM-PON, and flexibility and transmission efficiency can be improved more than DWA-PON.

In the present embodiment, an example of using an electric/optical converter the same as the first embodiment (that is, an electric/optical converter for generating a plurality of types of wavelengths using one wavelength selection light source) was shown. However an electric/optical converter the same as the second embodiment (that is, an electric/optical converter for using m number of fixed wavelength light sources) may be used. Also an electric/optical converter the same as the first embodiment may be used for one of up direction and down direction, and an electric/optical converter the same as the second embodiment may be used for the other direction.

In the present embodiment, an individual optical wavelength is used for the up direction and the down direction. But a part or all of the optical wavelengths to be used for the up direction and the down direction may be shared. In this case, only one type of optical wavelength may be assigned for the up direction when the transmission volume for the up direction is much less than that for the down direction, and the number of optical wavelengths to be assigned for the up direction may be dynamically increased as the rate of transmission in the up direction increases.

What is claimed is:

1. An optical communication network, comprising:
   a transmission system that generates optical transmission signals which are constituted by wavelength-division multiplexing plural series of time-division multiplexed optical signals, by assigning plural signal strings to optical wavelengths which are fewer than the number of said signal strings for each signal unit constituting said signal string;
   an optical communication path that propagate the optical transmission signals which are output from said transmission system; and
   a receiving system that restores said signal units by wavelength-division demultiplexing and time-division demultiplexing the optical transmission signals which are input from said optical communication path, and restoring the plural signal strings by rearranging the restored signal units;

wherein said transmission system further comprises:

a plurality of transmitters that outputs the corresponding signal strings at a timing and with the optical wavelength provided by a control signal for each of said signal unit; and an optical coupler that superimposes light waves which are output from said transmitters respectively and outputting the same to said optical communication path as the optical transmission signal;

wherein said transmitters output a request signal to request the specifications of the output timing and optical wavelength of each of the signal unit, said receiving system determines the output timing and optical wavelength of the signal unit responding to the request signal, and outputs the decision result as a response signal, and said transmitters output the signal unit at the timing and with the optical wavelength according to the specifications of the response signal; and wherein said transmitter further comprises:

a plurality of electric/optical converters that converts the electric signals into an optical signals with the corresponding optical wavelength;

a switch that distributes the electric signals to said electric/optical converters; a network controller that controls the distribution of said switch and the output timings of said electric/optical converters based on the specifications of the response signal; and an optical filter for removing the optical wavelength components other than a predetermined optical wavelength component from the light wave which is output by said electric/optical converter.

2. The optical communication network according to claim 1, wherein said switch is an inverse max which attaches label signals that indicate the rearrangement information to the electric signals and distributes the same to said electric/optical converters.

3. An optical communication network, comprising:

a transmission system that generates optical transmission signals which are constituted by wavelength-division multiplexing plural series of time-division multiplexed optical signals, by assigning plural signal strings to optical wavelengths which are fewer than the number of said signal strings for each signal unit constituting said signal string;

an optical communication path that propagate the optical transmission signals which are output from said transmission system; and a receiving system that restores said signal units by wavelength-division demultiplexing and time-division demultiplexing the optical transmission signals which are input from said optical communication path, and restoring the plural signal strings by rearranging the restored signal units;

wherein said transmission system further comprises:

a plurality of transmitters that outputs the corresponding signal strings at a timing and with the optical wavelength provided by a control signal for each of said signal unit; and an optical coupler that superimposes light waves which are output from said transmitters respectively and outputting the same to said optical communication path as the optical transmission signal;

wherein said transmitters output a request signal to request the specifications of the output timing and optical wavelength of each of the signal unit, said receiving system determines the output timing and optical wavelength of the signal unit responding to the request signal, and outputs the decision result as a response signal, and said transmitters output the signal unit at the timing and with the optical wavelength according to the specifications of the response signal; and wherein said receiving system further comprises:

an optical filter that removes optical wavelength components other than predetermined optical wavelength components from the optical transmission signals which are input from said optical communication path;

a plurality of optical/electric converters that extracts the corresponding optical wavelength component from the optical transmission signals which are output from said optical filter and converting the same to electric signals; and a switch that restores the plurality of series of signal strings by rearranging the electric signals which are output from said optical/electric converters.

4. The optical communication network according to claim 3, wherein said switch is an inverse demax which reads the label signals that indicates the rearrangement information from the electric signals, and rearranges said electric signals using the label signals.

* * * * *